(No Model.)
G. L. SCHMIDT.
MANUFACTURE OF TUBS OR VESSELS OF HYDRAULIC CEMENT.
No. 291,091.  Patented Jan. 1, 1884.
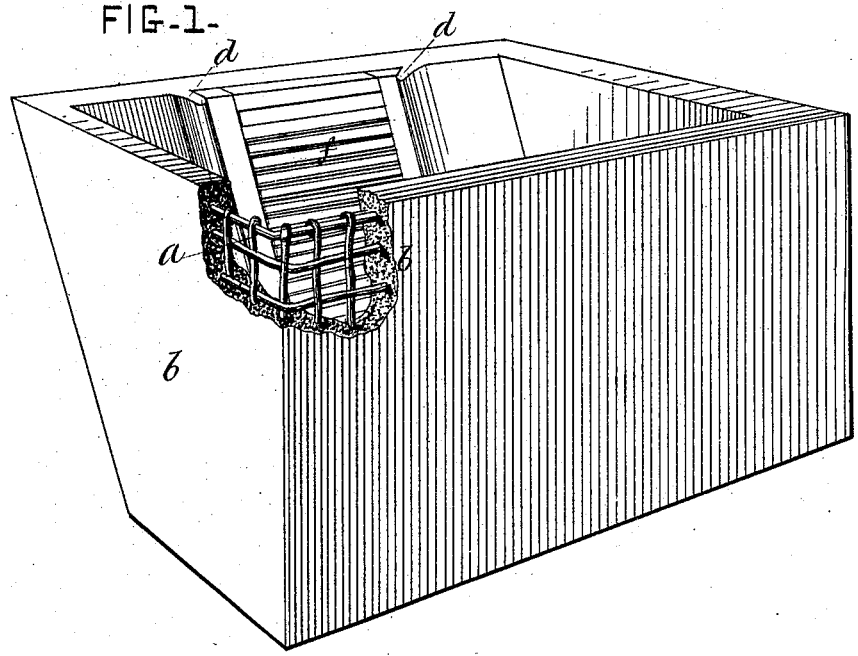
FIG-1-
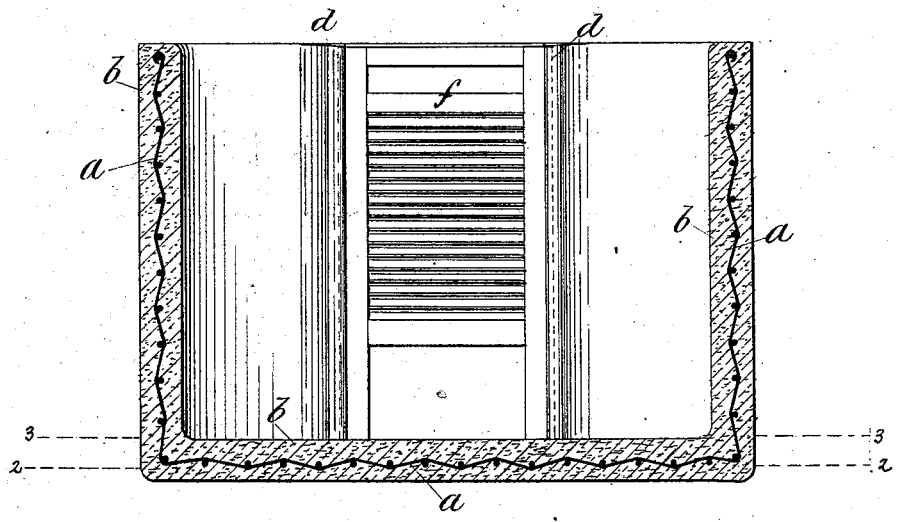
FIG-2-
ATTEST:
Jno. E. Gavin
Wm. S. Booth
INVENTOR:
George L. Schmidt
by Chas. M. Higgins
Attorney

UNITED STATES PATENT OFFICE.

GEORGE L. SCHMIDT, OF NEW YORK, N. Y., ASSIGNOR TO ANDREW G. MYERS AND FREDERICKE M. H. SCHMIDT, OF SAME PLACE, AND FREDERICK W. LAWRENCE, OF BROOKLYN, NEW YORK.

MANUFACTURE OF TUBS OR VESSELS OF HYDRAULIC CEMENT.

SPECIFICATION forming part of Letters Patent No. 291,091, dated January 1, 1884.

Application filed August 13, 1881. (No model.)

To all whom it may concern:

Be it known that I, GEORGE L. SCHMIDT, of New York city, county, and State of New York, have made certain new and useful Improvements in the Manufacture of Tubs or Vessels of Hydraulic Cement, of which the following is a specification.

Laundry and bath-tubs, as is well-known, have been made of hydraulic cement in one or more pieces, the same being suitably cast or molded in the desired shapes. As heretofore made, however, the tub has been composed of cement throughout, and reliance has been placed in the substance of the hardened cement itself to resist strains and the expansions and contractions due to heat and cold. Owing, however, to the friable granular nature of the cement, and its being a great non-conductor, the vessel is sometimes liable, when made entirely of cement, to crumble or crack at some part, if exposed to a severe strain, and particularly is this the case if unequally heated, as when the interior is exposed suddenly to hot water while its exterior is cold, which is liable to cause slight or serious cracks. To avoid these contingencies or render them harmless should they occur it has been heretofore proposed to inclose the cement tub in an external continuous casing of metal, thus forming a compound vessel, the external metal case of which forms an impervious sheath to prevent leakage, even in case the internal cement tub should become cracked. This expedient, while seeming to offer some advantages, is found only to increase the difficulty from irregular expansion, as the metal case is much more sensitive to heat than the cement, and has a much higher degree of expansion and contraction, so that the tendency of the cement to crack is rather increased than reduced thereby. Now, according to my improvement, I construct the cement tub or vessel with an internal metallic or non-metallic core or skeleton frame embedded in the walls of the vessel in the act of its formation, such metal skeleton frame being preferably perforated, reticulated, or meshed, whereby important advantages are secured, and the vessel greatly strengthened to resist strains or expansions without adding materially to its weight or cost. My invention also includes guide or socket ribs on the interior of the tub to receive and hold a removable wash-board, as hereinafter set forth.

In the annexed drawings, Figure 1 presents a perspective view of my improved cement tub with the cement broken away at one corner to expose the internal reticulated metal frame or skeleton. Fig. 2 is a vertical section thereof.

Before proceeding to mold my improved cement vessels I first prepare skeleton frames corresponding as near as possible to the exact form of the vessel, but of such a size as will be included in about the middle of the walls of the cement vessel when finished. This skeleton metallic frame is shown at $a$ in Figs. 1 and 2 embedded in the cement walls of the vessel, and it is not confined to the angles or edges or mere outline of the vessel, but is extended in a web over all sides of the form or vessel which is to be made, and the sides of the frame are preferably reticulated or meshed, or, in other words, it is preferably formed of strong wire cloth, as clearly illustrated in Figs. 1 and 2, so that it becomes thoroughly embedded in the cement which passes through and becomes anchored by the meshes. A metallic web thus forms the core or skeleton of the cement tub, which obviously must impart great strength thereto at all parts without appreciably increasing its weight, and being much cheaper than would be an external metal sheath. Furthermore, as this internal strengthening frame has a webbed or meshed form, hence but comparatively a small mass of metal is employed, and this is distributed all through the cement walls in strengthening fibers or sinews, so to speak, and the cement everywhere pervades the web, while the meshed structure of the frame allows a measurable articulation between the strands of the frame, and among the particles of the cement; hence it can be readily seen that while the strength of the cement vessel to resist direct strains at any point is greatly increased by this meshed metallic frame, yet it is also better able to resist changes of temperature for the reason that the general strength of the structure is increased, and its strength is of a measurably flexible character, and both cement and metal will practically expand and contract together on account of the slight mass of metal, its non-conducting character, and the measurable articulation allowed by the meshes, thus presenting an important improvement in the manufacture of cement vessels.

Instead of making the frame $a$ of wire cloth it may be made of perforated sheet metal, with either smooth or jagged perforations; but the wire cloth is considered preferable, as it gives greater flexibility.

In molding the improved vessel cement sufficient to form one-half the thickness of the bottom is first placed in the bottom of the mold, as indicated by the dotted line 2 in Fig. 2. The wire frame $a$ is then placed in the mold in proper central position therein, with its bottom resting on the bottom layer of cement. An additional layer of cement is now added to cover the bottom of the wire frame and form the complete bottom of the tub, as indicated by the line 3. The plunger or center of the mold is now inserted and the cement rammed into the space around the sides to form the side walls of the tub, leaving the wire frame firmly embedded therein, as shown in Fig. 2. The cement is of course moistened, mixed, and manipulated in the usual way, which forms no part of my present invention, and is well understood by workers in hydraulic cement. When the cement is set, the inner mold or plunger is removed and the interior of the tub finished or polished, as may be desired, and after this is done the tub is removed from the external mold and the exterior is finished in a similar manner.

In forming the wire frame $a$ the wires are securely fastened at the corners, when necessary, by twisting or soldering, or both, so as to render the frame continuous and strong; and I would specify that before the frame is embedded in the cement it should be galvanized, which will materially increase its strength, and if the wire be iron, as is preferable for strength and cheapness, it will prevent all oxidation and stain, as otherwise the oxide would gradually exude through the cement and stain the clothes. The wire frame $a$, as will be observed from Fig. 2, is not embedded quite in the middle of the cement walls but preferably nearer to the outside; but this position is not essential.

In forming laundry-tubs I prefer to provide them on the interior of the front wall with two parallel ribs or guides, $d\ d$, as shown in Figs. 1 and 2, having inwardly-beveled faces, so as to form a dovetailed socket between them which will conveniently receive and hold a removable wash-board, $f$, of wood or other material. These guide or socket ribs $d\ d$ are preferably formed of cement integral with the wall in the act of molding, as will be understood; but they may be formed separately and attached to the cement, if desired.

In the drawings I have shown my invention applied to an ordinary laundry-tub; but it may also be used for bath-tubs, drinking-troughs, or other large vessels of hydraulic cement.

I am aware that it is not broadly new with me to strengthen articles made of plastic material by inserting or embedding therein wire or other forms of metal, and that wire has been formed into the shape the article is to have when completed with the ends joined to the sides, so as to comprise a complete frame, and such complete frame or core then embedded in the plastic material in the manufacture of the complete article. I deem it important that the horizontal wires of the wire-work should be continuous around the vertical corners, so that the frame shall have an equal strength throughout, and be as strong at the junction of the sides and ends as anywhere else.

What I claim is—

1. A tub or vessel of hydraulic cement constructed with a wire frame, made complete, of form corresponding to that of the tub when finished, the horizontal wires of said frame being continuous around the corners joining the sides to the ends and embedded in the cement walls, substantially as herein specified.

2. A laundry-tub provided with two guide and socket ribs on its front wall adapted to receive and retain a removable wash-board, substantially as herein set forth.

GEORGE L. SCHMIDT.

Witnesses:
CHAS. M. HIGGINS,
FREDERICK W. LAWRENCE.